Dec. 15, 1959     J. W. CROWNOVER     2,917,670
ELECTROSTATIC GENERATOR AND IGNITION SYSTEM
Filed June 17, 1958     2 Sheets-Sheet 1

JOSEPH W. CROWNOVER,
*INVENTOR.*
WHANN & McMANIGAL
*Attorneys for Applicant*

JOSEPH W. CROWNOVER,
INVENTOR.
WHANN & McMANIGAL
Attorneys for Applicant

United States Patent Office 2,917,670
Patented Dec. 15, 1959

2,917,670

ELECTROSTATIC GENERATOR AND IGNITION SYSTEM

Joseph W. Crownover, La Jolla, Calif.

Application June 17, 1958, Serial No. 742,604

11 Claims. (Cl. 315—209)

This invention relates to an electrostatic voltage generator, particularly adapted for use in ignition systems, the invention utilizing a variable condenser wherein a sharp decrease in capacitance or dielectric constant of the condenser material is the occasion of an abrupt increase in voltage across the condenser. In particular, the invention utilizes a condenser formed of certain ceramic materials which may preferably be barium titanate compositions having a strain coefficient of capacitance such that at normal temperatures, i.e., room temperature (25° centigrade), an increase in pressure on the material very materially decreases the dielectric constant, i.e., the capacitance of the material. The magnitude of capacitance change of the dielectrics used as a function of applied stress has been found entirely adequate for purposes of the invention, i.e., particularly ignition purposes, utilizing circuitry as described herein.

The present invention is related to and is an improvement on the inventor's prior invention, as disclosed in U.S. Patent No. 2,814,660. In the prior patent a variable condenser is charged from a relatively low voltage source, which may be a radioactive battery, and a relatively high voltage pulse is achieved by rapidly decreasing the capacity of the condenser which, in the prior patent, is accomplished by mechanically snapping apart two plates of the condenser. It has been discovered that a similar result can be secured simply by stressing the dielectric material of this invention and taking advantage of the particular strain coefficient of capacitance of the dielectric material, as described above. Thus, mechanically, the system of this invention requires only a simple means for stressing the dielectric material which practically, in a preferred form of the invention, is simply a mechanical device for tapping the dielectric, i.e., for suddenly applying an impacting force or relatively high loading to the dielectric. The voltage source from which the variable condenser is initially charged may be a radioactive battery, as in the prior patent. It is to be understood that the ceramic materials are classes of ceramics having a suitable strain coefficient of capacitance and are distinctly not piezoelectric ceramics which generate a voltage pulse when stressed.

The invention is particularly adapted for use in ignition systems for internal combustion engines. The power of the engine is, of course, available for stressing the dielectric. Voltage pulses of suitable magnitude can be achieved using relatively low voltage sources, and the system adapts itself to generation of voltage pulses for ignition at appropriately timed points in the cycle of the engine. In the system of the invention, since it produces high voltage pulses timed in accordance with the ignition requirements of the engine, no switch contacts or breaker points are needed in the system.

The primary object of the invention is to utilize the strain coefficient of capacitance of certain dielectric materials for generating high voltage pulses upon change in dielectric constant of the materials and particularly to utilize the said principle in ignition systems.

Another object of the invention is to generate high voltage electrostatic pulses by means of a condenser, the capacitance of which is variable upon the application of stress thereto, the condenser being initially charged from a relatively low voltage battery and the condenser generating a high voltage pulse when its capacity is reduced.

Another object of the invention is to utilize the electrostatic voltage generating principle of the foregoing objects in the ignition system of an internal combustion engine.

Another object of the invention is to utilize high dielectric ceramics as electrostatic voltage generators by utilizing their properties that upon the application of stress to the material the capacitance is lessened and the voltage charge on the capacitor at the time is proportionately increased.

Another object of the invention is to provide an electrostatic voltage generator particularly adapted for use in ignition systems, comprising a high dielectric ceramic condenser material having the property that the dielectric constant of the material is decreased when the material is stressed, the dielectric forming a condenser connected to be charged from a low voltage battery with mechanical means for applying a sudden impact to the dielectric for generating a high voltage pulse.

Further objects and numerous additional advantages of the invention will become apparent from the following detailed description and annexed drawings wherein.

It has been found that certain high dielectric ceramics of the general (AB)O$_3$ type exhibit high strain coefficients of capacitance. A typical chemical formulation of such a strain sensitive high dielectric ceramic consists of 70% BaTiO$_3$ in solid solution with 30% SrTiO$_3$. Other formulations can be made having high dielectric constant and high strain coefficients of capacitance consisting generally of BaTiO$_3$, SrO and PbZrO$_3$ with small additives consisting of impurities. These materials are distinctly non-piezoelectric materials, the property that they possess, which is utilized in this invention, being their relatively high strain coefficient of capacitance.

Figure 1:
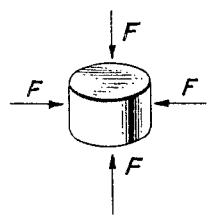
Fig. 1 is a schematic view of a ceramic condenser element having pressure applied thereto.
Figure 2:
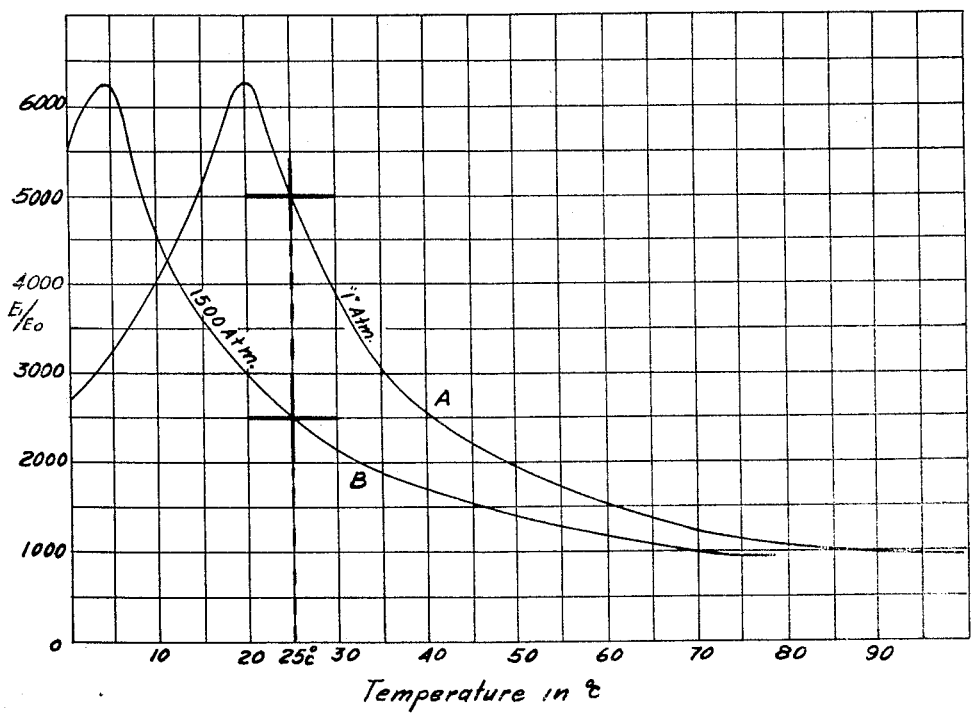
Fig. 2 is a graph of the dielectric constant of certain high dielectric polycrystalline ceramics plotted as a function of temperature.

The graph of Fig. 2 is a graph of the dielectric constant of a high dielectric polycrystalline ceramic which is 70% BaTiO$_3$ and 30% SrTiO$_3$ plotted as a function of temperature. Curve A is plotted at a pressure of one atmosphere and curve B is plotted at 1500 atmospheres. From the figure it will be observed from the curves that at room temperature (25° centigrade) a pressure of 1500 atmospheres decreases the dielectric constant to a value approximately one-half that obtained at one atmosphere. The material which was used for purposes of plotting the curves of Fig. 2 was in the form of a ceramic disc which was subjected to the variation in pressure, as shown in Fig. 1. The magnitude of capacitance change of these dielectrics, as illustrated in Fig. 2, as a function of the applied stress, is entirely adequate for electrostatic generation of voltage pulses suitable for ignition purposes, utilizing circuitry which will be described presently. The type of circuitry utilized is illustrated schematically in Fig. 3. Numeral 10 designates a voltage source which may be a relatively low voltage of approximately 5000 volts, and this voltage source may be a radioactive battery. The character $C_1$ represents the capacitance of the radioactive battery. The radioactive battery is connected as shown to charge the variable condenser of the invention designated 11. The capacitance of the variable condenser is indicated by the character $C_2$. The variable condenser 11 comprises one of the ceramic materials as described above, such as a polycrystalline ceramic consisting of 70% barium titanate and 30% strontium titanate. The condenser may be in the form of a disc of the material or a relatively short cylindrical bar with electrodes formed on the ends thereof in any manner known in the prior art. In the discharge circuit of the variable condenser 11 is a resistor designated by the character R and the spark plug of the ignition system is connected across this resistor as shown, the circuit having a ground connection as shown at 12. The capacitance of the radioactive battery, or other voltage source, is designed to have a value equal to the quiescent capacitance of the condenser 11. The generated potential across condenser 11 increases as the capacitance decreases, as described, until the IR drop across the resistance R exceeds the ionization potential of the air gap in the spark plug, at which time spark discharge occurs.

The electrical time constant $T=RC_1C_2/C_1+C_2$ must be larger in relation to the mechanical time constant of the stressing of the condenser $C_2$.

When the capacitance of condenser $C_2$ is reduced by stressing it under the above limitations to one-half its quiescent capacitance value, the voltage across it will be doubled. This, in turn, causes a potential difference to exist across the spark gap equal to the original doubled potential across condenser $C_2$. If this is 10,000 volts, then the potential across the spark gap will be 10,000 volts. However, this maximum potential may only be realized when the mechanical time constant for a full charge on condenser $C_2$ is very small in comparison to the electrical time constant.

The necessarily small mechanical time constant may be realized by a form of mechanical device for stressing the dielectric material by striking the sensitive material a sharp tap, i.e., by applying a sudden impact or loading. It has been found that an extremely light impinging or impacting mass is capable of generating sufficient stress to decrease the dielectric constant of certain ceramics to half of their original value.

Figure 3:
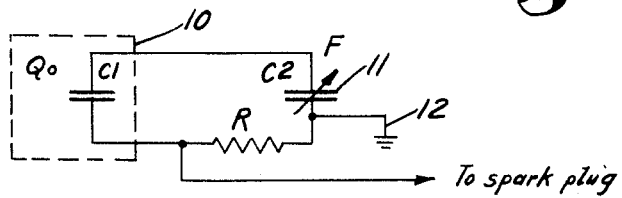
Fig. 3 is a schematic diagram of the general circuitry of the invention embodied in an ignition system.
Figure 4:
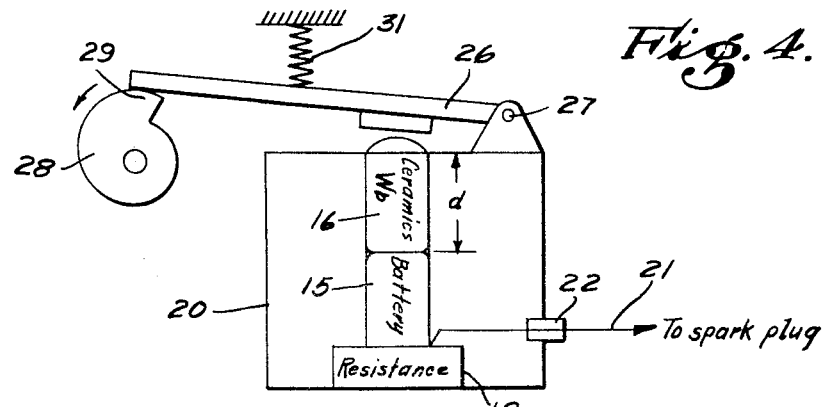
Fig. 4 is a schematic view of one adaptation of the mechanical aspects of the invention.

Fig. 4 is a schematic view of a mechanical device embodying the invention and disclosing one form of generator embracing the circuitry of Fig. 3. In Fig. 4 the device is set up as a self-contained unit for providing ignition for an ignition system. In Fig. 4 the battery is shown at 15, and, as pointed out above, the battery may be a radioactive battery although it may be some other type of low voltage source. The strain sensitive ceramic is shown in the form of the cylindrical member 16 which is superimposed on top of the battery to form a continuous column in electrical circuit relationship. The ceramic may be the composition identified in the foregoing, having electrodes formed at its opposite ends in any manner known to the art. For convenience in assembling a self-contained unit, the ceramic and battery are shown disposed upright on a block of resistance material designed by the numeral 18 and being in electrical circuit relationship therewith. The units as so far described are mounted within a frame designated by the numeral 20, which is electrically conductive so that a circuit is formed through the frame and through the ceramic, the battery and the resistance in accordance with the diagram Fig. 3. Numeral 21 designates an electrical lead connected to the juncture between the battery and the resistance and extending to the exterior of the structure 20 through an insulator 22, this lead connecting to the spark plug, as shown.

The mechanism for applying a sharp tap, or blow, to the strain sensitive material comprises a lever 26 pivoted to the frame 20 on a pivot pin 27. Numeral 28 designates a rotary cam having a shoulder, or dwell 29, which cooperates with the lever 26, allowing the lever to snap downwardly when its end drops off the dwell 29. The cam 28 is preferably driven by the cam shaft of an internal combustion engine so that the voltage pulse generated by the system is generated at a time as appropriate to initiate an explosion in a cylinder. The lever 26 is biased downwardly by a coiled biasing spring 31 and the lever is disposed over the upper end of the dielectric material 16 so that when the end of the lever drops off the cam it is snapped downwardly sharply to apply a sharp tap, or impact, against the upper end of the dielectric material. When this happens, the capacitance of the material is reduced, as described above, and the voltage across the condenser is increased proportionately so that a voltage pulse appears across the spark plug, as described in the foregoing.

The force generated by the mechanical arrangement can be accurately calculated in terms of the sizes and weights of the various parts, and the device can readily be designed to produce a voltage pulse of the desired magnitude.

The specific operation of the electrostatic generating system may be understood from a consideration of the circuit shown in Fig. 3. The capacitance of the condenser $C_2$ is caused to change rapidly by being struck or tapped in the manner described. Initially, the plates of capacitor $C_2$ are electrically charged by the battery 10 to a potential equal to the potential across the equivalent capacitor $C_1$ of the battery.

When the capacitor $C_2$ is tapped its capacitance is decreased, the direction of current flow in the resistor R is reversed and the charge on condenser $C_2$ flows back into condenser $C_1$. The system strives to reach a static state in which the charges are divided in proportion to the capacity. If the capacitance of $C_2$ is reduced by half, the charge, i.e., the potential across it, will be doubled.

The result of the interchange of charge between the two condensers is a varying potential across resistor R, having a frequency equal to the frequency of tapping or striking of the capacitor $C_2$. The amplitude of the varying potential depends upon the amount of static charge originally supplied to condenser $C_2$ by the battery 10. The capacitance of $C_2$ is suddenly decreased when this capacitance is struck and the voltage across $C_2$ suddenly rises before the charge on $C_2$ can leak off through R to $C_1$. This causes a high potential to exist across R and hence across the spark plug. The air or gas adjacent the spark plug will ionize when ionization potentials are reached, and a spark will jump the gap, permitting the charges on $C_2$ and $C_1$ to come to an immediate state of equilibrium before all but a very small amount of electrical energy is dissipated in resistor R.

For this to occur, as pointed out above, the electrical time constant of the resistor R and condenser $C_2$ combination must be substantially greater than the mechanical time constant of the mechanical device which stresses the condenser $C_2$. This is necessary in order that current will not leak through a resistor R in an amount great enough to appreciably lessen the high voltage. The mechanical device described heretofore has an adequately short time constant for the purpose desired. After the spark discharge at the spark plug, condenser $C_2$ will recharge to the potential of the battery 10.

Figure 5:
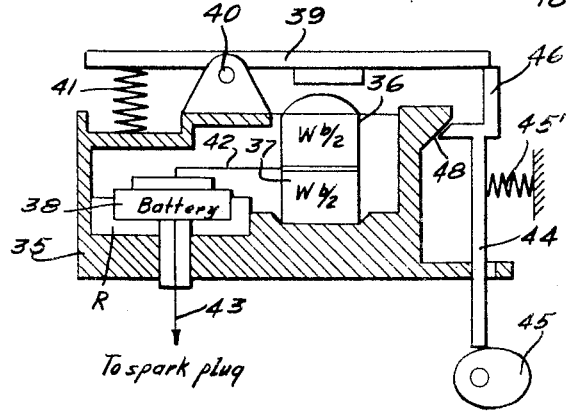
Fig. 5 is a diagrammatic view of a modified form of the invention.

Referring to Fig. 5 of the drawings, another form of the invention is shown which is a preferred mechanical arrangement for adapting the invention in an ignition system. In Fig. 5 a housing for the unit, made of insulating material, is shown at 35. Disposed within the housing, or casing 35, are two units, or cells, of sensitive ceramic material indicated by the numerals 36 and 37 disposed in superimposed end-to-end relationship, i.e., with one on top of the other, and abutting in electrical circuit relationship.

The battery is designated by the numeral 38 disposed in a cavity, or depression, in a block, or disc, of resistance material designated by the numeral R so as to be in circuit relationship therewith. Numeral 39 designates the lever which impacts against the end of the uppermost cell of sensitive dielectric material, it being understood that the two units of ceramic material form condensers in end-to-end relationship. The lever 39 is pivoted on a pivot 40 extending through supporting arms upstanding from the housing 35. The lever is biased in a clockwise direction by a coil biasing spring 41.

The electrical juncture between the two sensitive cells is connected by a wire 42, as shown, to the battery 38, i.e., the two ceramic condensers are connected in parallel so that as their capacitance is reduced the voltage across them is increased. The battery is connected to the spark plug by a wire 43, as shown.

The lever 39 is moved away from the unit 36 and allowed to drop, impacting thereon, by means of a reciprocable stem 44, the end of which is driven by a cam 45 having a lobe which lifts the stem and then allows it to drop. The cam 45 may, of course, be driven by the cam shaft of an internal combustion engine. The stem 44 has some angular movement and is biased inwardly by a coil spring 45'. At its upper end it has a sear 46 having a slanting portion, as shown, the sear lifting the end of lever 39 on the upward stroke, as imparted by the cam. The slant portion of the sear 46 engages a similarly slanted surface 48 formed on the outside of the housing 35, and when these surfaces engage the upper end of the stem 44 is caused to be moved outwardly so that the sear disengages from the end of the lever 39, allowing it to drop down, striking a sharp blow against the upper end of the upper ceramic element. This force, or blow, is of course transmitted to the two elements and due to their strain sensitive characteristics their capacity is reduced similarly and at the same time. With the arrangement shown, and as can be seen, as cam 45 rotates the condenser units are intermittently tapped by the lever mechanism so that voltage pulses are generated and are delivered to the spark gap as necessary for ignition purposes.

From the foregoing those skilled in the art will observe that the herein invention provides a novel electrostatic generator utilizing the strain coefficient of capacitance of certain solid dielectrics, the system generating high voltage pulses upon the capacitance of the dielectric condensers being changed upon stress being applied thereto. The system is capable of effectively generating high voltage pulses in timed relationship to the operation of internal combustion engines, or the like, for purposes of ignition. The invention can be built into a self-contained ignition unit, as described, utilizing a relatively low voltage battery which may be a radioactive battery. The equipment required is relatively simple, not involving complicated parts, and is easy of manufacture and assembly.

The operation of Fig. 5, electrically, is the same as that of Fig. 4, the difference being in the two ceramic elements electrically connected in parallel.

The foregoing disclosure is representative of preferred forms of the invention, it being understood that various modifications and alternatives may be adopted and utilized by those skilled in the art without departing from the spirit and scope of the invention which is to be in accordance with the claims appended hereto.

I claim:

1. An electrostatic ignition system comprising a condenser of the type adapted to have its dielectric constant changed upon the application of stress thereto; means comprising a voltage source connected to said condenser for charging the said condenser; means forming a discharge circuit for said condenser having a spark gap therein; and means for applying stress to said condenser for reducing its capacity and simultaneously increasing the voltage across said condenser whereby a relatively high voltage pulse is produced in said discharge circuit.

2. The structure of claim 1, wherein said voltage source is a radioactive battery.

3. The structure of claim 1, wherein said condenser comprises a barium titanate ceramic having electrodes formed on opposite surfaces thereof.

4. The structure of claim 1, wherein said condenser comprises a barium titanate ceramic having electrodes formed on opposite surfaces thereof and said voltage source is a radioactive battery.

5. The structure of claim 1, wherein said means for applying stress to said condenser comprises a device for subjecting said condenser to a sudden sharp blow.

6. The structure of claim 1, wherein said condenser comprises a barium titanate ceramic having electrodes formed on opposite surfaces thereof; and said means for subjecting said condenser to stress comprises a device for applying a sudden sharp impact to said condenser.

7. The structure of claim 1, wherein said discharge circuit includes resistance means and a spark plug forming part of the ignition sytem of an internal combustion engine.

8. In an electrostatic ignition system in combination: means comprising a condenser of a type adapted to have its dielectric constant changed upon the application of stress thereto; a voltage source comprising a battery, said condenser and battery being physically juxtaposed to form an electrical circuit therethrough whereby the battery charges said condenser; means forming a discharge circuit for said condenser having a spark gap therein; and means for applying a stress to said condenser whereby to reduce its capacitance and thereby increase the voltage thereacross whereby a voltage pulse is impressed on said discharge circuit to produce a spark discharge at said spark gap.

9. An electrostatic ignition system comprising a condenser of the type adapted to have its dielectric constant changed upon the application of stress thereto; means comprising a voltage source having a charging connection to said condenser, said connection including a resistance element in series with said condenser; a discharge circuit connected across said resistance element; means for applying stress to said condenser for reducing its capacitance and simultaneously increasing the voltage across said condenser whereby a relatively high voltage pulse is produced in said discharge circuit; and said means for applying stress having a mechanical time constant which is relatively small compared to the RC time constant of said resistor and capacitor.

10. The structure of claim 9 wherein said means for applying stress comprises an impact member, and cam means for operating said member, said cam means being formed to provide a drop-off to provide for sudden actuation of said impact member.

11. An electrostatic ignition system, comprising: a condenser of the type adapted to have its dielectric constant changed upon the application of stress thereto; means comprising a voltage source having a charging connection with said condenser, said voltage source having a capacitance value substantially equal to the quiescent capacitance of said condenser; means forming a discharge circuit for said condenser having a spark gap therein; and means for applying stress to said condenser for reducing its capacity and simultaneously increasing the voltage across said condenser with respect to said voltage source, whereby a high voltage pulse is produced in said discharge circuit in response to the application of said stress.

References Cited in the file of this patent

UNITED STATES PATENTS 2,248,574    Knight  ---------------- July 7, 1941